United States Patent

[11] 3,559,536

| [72] | Inventor | John P. Mason |
| | | Los Angeles County, Calif. |
| [21] | Appl. No. | 759,035 |
| [22] | Filed | Sept. 11, 1968 |
| [45] | Patented | Feb. 2, 1971 |
| [73] | Assignee | Esso Production Research Company |
| | | Houston, Tex., a corporation of Delaware |

[54] MULTIPOSITION SHAFT ACTUATOR
4 Claims, 4 Drawing Figs.

[52] U.S. Cl............................................................ 91/409,
91/449, 91/454
[51] Int. Cl........................................................F15b 11/08,
F15b 20/00
[50] Field of Search............................................ 91/390,
400, 51, 409, 402, 399, 440, 454, 449, 47, 48

[56] References Cited
UNITED STATES PATENTS

| 2,099,422 | 11/1937 | Farmer.......................... | 91/402X |
| 2,757,294 | 7/1956 | Smith............................. | 91/402X |
| 2,924,201 | 2/1960 | Gilovich........................ | 91/48 |
| 3,156,157 | 11/1964 | Smith et al.................... | 91/48 |
| 3,246,572 | 4/1966 | Ogilvie.......................... | 91/402X |
| 3,433,131 | 3/1969 | Soyland et al. ............... | 91/454X |
| 3,143,131 | 8/1964 | Spencer......................... | 251/138X |

*Primary Examiner*—Martin P. Schwadron
*Assistant Examiner*—Irwin C. Cohen
*Attorneys*—Thomas B. Mc Culloch, Melvin F. Fincke, John S. Schneider, Sylvester W. Brock, Jr., Kurt S. Myers and Timothy L. Burgess ABSTRACT: A fluid powered multiposition shaft actuator controlled by pilot valves. The actuator moves automatically to a chosen position upon failure of control power to power-operated pilot valves. A housing containing a shaft forms two fluid-powered cylinders at each end thereof. A piston is arranged in each cylinder. These pistons are mechanically linked to each other and to the shaft for positioning the shaft. When the shaft is rotatable, the linear force of the pistons is converted to rotary force for rotating and positioning the shaft.

PATENTED FEB 2 1971
3,559,536
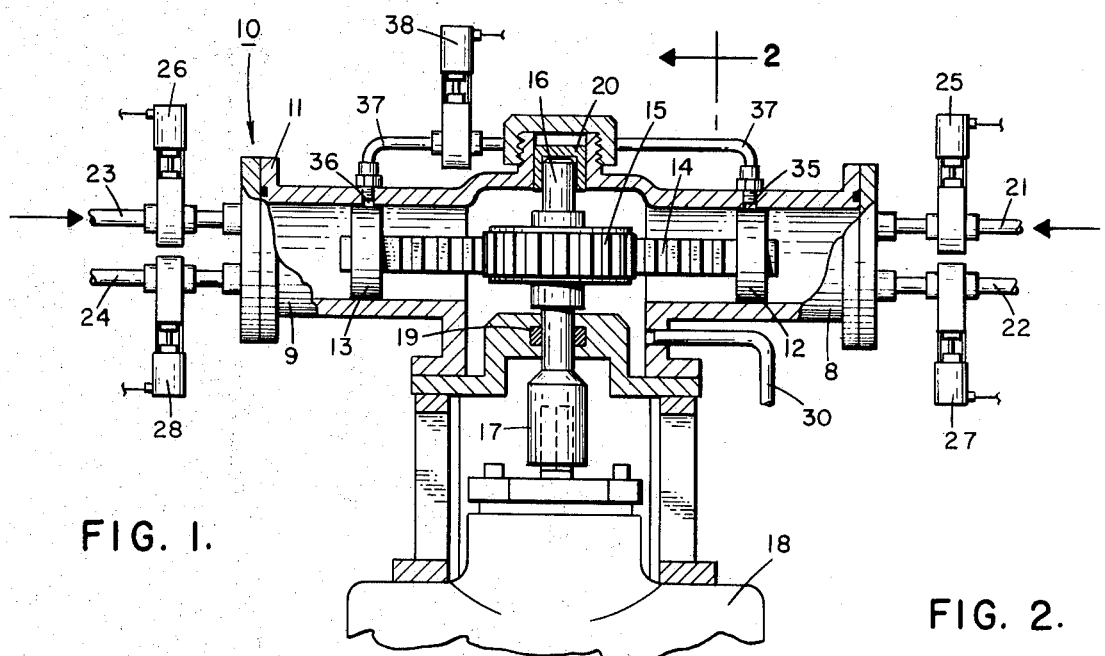
FIG. 1.
FIG. 2.
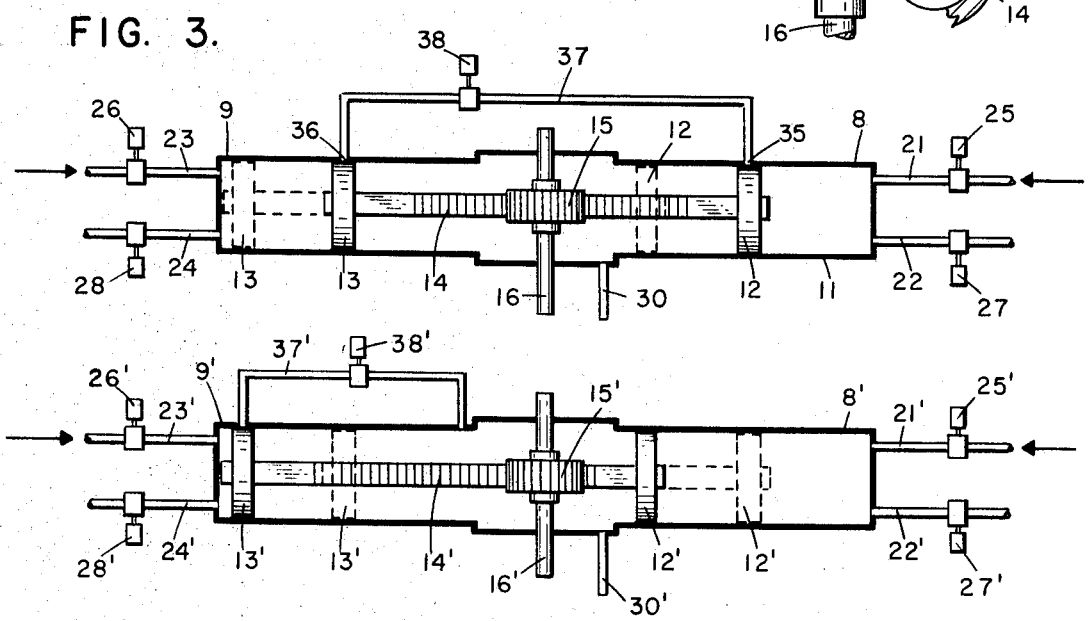
FIG. 3.
FIG. 4.
INVENTOR.
JOHN P. MASON,
BY John S. Schneider
ATTORNEY 3,559,536

MULTIPOSITION SHAFT ACTUATOR

BACKGROUND OF THE INVENTION

1. Field of the Invention

The present invention concerns a fluid-powered multiposition shaft actuator which is controlled by power-operated pilot valves. More particularly, the invention concerns an actuator for a movable (linearly or rotatably) shaft which moves automatically to a chosen position upon failure of control power.

2. Description of the Prior Art

Commonly used fluid-powered multiposition shaft actuators consist of two fluid-powered pistons attached to a mechanical linkage which converts the linear force of the pistons moving in power cylinders to rotary force for positioning the shaft. When in operation, operating fluid under pressure flows into one cylinder pushing the piston therein. The opposite cylinder is vented or exhausted to the operating fluid reservoir which may be an accumulator or the atmosphere. The flow of operating fluid to the piston and exhaust thereof is controlled by power-operated pilot valves which are operated by an external circuit, which may be mechanical, fluid or electrical, overridden by position switches operating on the shaft to obtain intermediate positions for the pistons and shaft. The actuator of the present invention is an improvement over such shaft actuators by providing ports in the power cylinders connected together by an external closed passageway containing another power-operated pilot valve for controlling flow of operating fluid through the passageway. These ports are located to cause the actuator to move to any desired predetermined position upon control power failure.

SUMMARY OF THE INVENTION

The multiposition shaft actuator of the present invention comprises a housing containing a movable shaft mechanically linked to two spaced-apart pistons, each arranged in a power cylinder which forms each end of the housing. The pistons are linked to the shaft to position it. Suitable operating power fluid inlets and exhausts controlled by power-operated pilot valves are provided on the housing. Another operating fluid exhaust is provided on the housing between the pistons. Also, spaced-apart ports are arranged on the housing and in fluid communication with each other through a closed passageway which interconnects the ports exterior of the housing. Another power-operated pilot valve is arranged on that passageway to permit and prevent flow of fluid therethrough. The pilot valves are set so that upon control power failure, the inlets are open, the exhausts are closed and the passageway is open. The operating fluid in one of the cylinders is exhausted until the pistons reach and, in turn, the shaft reaches, a preselected position. The shaft may be linearly movable or rotatable. When rotatable, the pistons are linked to the shaft in a manner to convert the linear force of the pistons to rotary force for rotating and positioning the shaft.

A primary object of the present invention is to provide an improved fluid-powered multiposition shaft actuator.

The above object and other objects and advantages of the invention will be apparent from a more detailed description thereof when taken with the drawings wherein:

BRIEF DESCRIPTION OF THE DRAWING

FIG. 1 is a view partly in cross section illustrating one embodiment of the invention;

FIG. 2 is a view taken along lines 2–2 of FIG. 1;

FIG. 3 is a schematic view of the embodiment of the invention illustrated in FIG. 1; and FIG. 4 is a schematic view illustrating another embodiment of the invention.

DESCRIPTION OF THE PREFERRED EMBODIMENTS

Referring to FIG. 1, an actuator generally designated 10 includes a housing 11 containing two spaced-apart pistons 12 and 13 movably arranged in power cylinders 8 and 9, respectively. As shown also in FIG. 2, these pistons are connected together by a rack 14 which, in turn, meshes with a pinion gear 15 which is mounted on a rotatable shaft 16. Shaft 16 is connected to a control member, such as a valve stem located in a valve body, generally designated 18, by means of a connector 17. Shaft 16 is arranged in bearings 20 and properly sealed in housing 18 by seals 19.

Each end of housing 11 is provided with operating power fluid inlet and exhaust ports and conduits. An operating power fluid inlet conduit 21 and an operating power fluid exhaust conduit 22 are connected to the end of power cylinder 8 and an operating power fluid inlet conduit 23 and an operating power fluid exhaust conduit 24 are connected to the end of power cylinder 9. Control power-operated pilot valves, which may be mechanically, fluidly or electrically (or combinations thereof) operated, are arranged on these inlet and exhaust conduits. For purposes of illustration, they are shown as being electrically-mechanically operated solenoid valves. Such two-position (open-closed) solenoid valves move to one position when electric power is supplied to them and automatically, under the bias of a spring, move to the other position when electric power to them is cut off. Solenoid valve 25 arranged on conduit 21 and solenoid valve 26 arranged on conduit 23 open upon failure of electrical power supplied to the solenoid and close upon application of electrical power to the solenoid. Solenoid valves 27 and 28, arranged respectively on conduits 22 and 24, operate in an opposite manner; i.e., these valves close upon failure of power supplied to the solenoid and open upon application of electrical power to the solenoid. The operating power fluid may be supplied from a source of power fluid, not shown, and exhausted to the atmosphere or may be supplied from and exhausted to an accumulator, not shown. A conduit 30 is connected to housing 11 between pistons 12 and 13 to exhaust that center portion of the housing to either reservoir (atmosphere or accumulator).

Housing 11 is also provided with two spaced-apart ports 35 and 36 connected together exterior of housing 11 by a tube or conduit 37 on which is arranged another control power-operated solenoid valve 38. This valve operates in the same manner as valves 25 and 26; i.e., it opens upon failure of electrical power supplied to the solenoid and closes when electric power is applied to the solenoid.

Ports 35 and 36 are arranged so that the actuator will attain a selected or chosen position when control power fails. The power-fail position illustrated in FIGS. 1 and 3 is a middle position. If, for example, the valve being controlled in valve body 18 is fully open when rack 14 is in its extreme left-hand position (and fully closed when rack 14 is in its extreme right-hand position), then when power fails, the valve would assume a half-open, half-closed position, as shown in FIG. 1. Such an operation is schematically illustrated in FIG. 3. The valve in valve body 18 has been opened completely (dotted line positions of pistons 12 and 13) by an electrical circuit arrangement in which electrical power is not supplied to pilot valves 25 and 27 but is supplied to pilot valves 26 and 28. Thus, conduits 21 and 24 are open and conduits 22 and 23 are closed. Electrical power is supplied to pilot valve 38 which maintains passageway 37 closed. These positions of the pilot valves caused both pistons 12 and 13 to be moved to the dotted line positions shown in FIG. 3. In such movement, rack 14 rotated shaft 16 counterclockwise to open the valve fully. Upon failure of control power to the pilot valves, valve 25 remains open, valve 27 remains closed, valve 26 opens, valve 28 closes and valve 38 opens to maintain open conduit 21, open conduit 23 and passageway 37, maintain closed conduit 22 and close conduit 24. Passageway 37 fluidly communicates cylinder 8 and exhaust 30 to permit operating power fluid in cylinder 8 to exhaust to the reservoir through passageway 37, pilot valve 38 and exhaust 30. Pistons 12 and 13 and rack 14 will then be moved to the solid-line positions shown in FIG. 3. Such movement rotates shaft 16 clockwise to move the valve in valve body 18 to its preselected middle position.

In FIG. 4, an arrangement is shown in which when control power fails, the pistons assume a left-hand position in which the valve is maintained open. Assuming, as in the example discussed with respect to FIG. 3, that the valve being controlled in valve body 18 is half-open when rack 14 is in its middle position, then, when power fails, the pistons are moved to their left-hand positions, shown in FIG. 4, in which positions the valve is fully open. In this operation, the pilot valves are controlled by an electrical circuit arrangement in which electrical power is not supplied to pilot valves 25', 26', 27' and 28' but is supplied to pilot valve 38'. In these pilot valve positions, conduits 21' and 23' are open and conduits 22' and 24' and passageway 37' are closed. Pistons 12' and 13' and rack 14' are positioned as shown in dotted lines in FIG. 4 in their middle positions and the valve connected to shaft 16' then is in its half-open or half-closed position. Upon power failure, valves 25' and 26' remain open, valves 27' and 28' remain closed and valve 38' opens. Opening of valve 38' opens passageway 37' and fluidly communicates operating fluid pressure within cylinder 9' to the space between the pistons and exhaust 30'. Venting of cylinder 9' causes pistons 12' and 13' to be moved to the left until these pistons and rack 14' assume the solid line position shown in FIG. 4, in which position the valve connected to shaft 16' will be fully open.

Of course, if it were desired to have the valve fully closed upon power failure, passageway 37' and a valve 38' would be arranged on cylinder 8' instead of on cylinder 9'.

Other embodiments of the invention will be apparent to those skilled in the art to which this invention applies. For example, two valves might be used to isolate the fail-safe ports (35 and 36, FIG. 1) if venting the cylinder section of the actuator housing were, for some reason, undesirable. Also, one three-way solenoid valve could be used instead of separate inlet and exhaust valves (valves 1 and 2 or valves 3 and 4, FIG. 1). In addition, the mechanical linkage between the pistons and the shaft may be any desired type, such as gear, scotch yoke, chain and sprocket, etc. Further, instead of causing a shaft to rotate as described with respect to the embodiments illustrated in FIGS. 1 to 4, the actuator could readily be made to operate a shaft push-pull. The physical arrangement of the elements can take any of the forms used with dual cylinder fluid actuate actuators. The fail-in chosen position feature of the actuator is applicable to all of such variations. These and other changes and modifications may be made in the specific illustrative embodiments of the invention shown and described herein without departing from the scope of the invention as defined in the appended claims.

I claim:
1. A multiposition shaft actuator comprising:
a housing;
a movable shaft arranged in said housing;
first and second operating fluid power cylinders, each forming one end of said housing;
a first piston arranged in said first cylinder;
a second piston arranged in said second cylinder; means mechanically linking said pistons to each other and to said shaft adapted to position said shaft;
first operating fluid inlet and exhaust means including first valve means, operated by control power fluid, for introducing operating fluid into said first cylinder when in one position and to exhaust operating fluid from said first cylinder when in another position;
second operating fluid inlet and exhaust means including second valve means, operated by control power fluid, for introducing operating fluid into said second cylinder when in one position and to exhaust operating fluid from said second cylinder when in another position;
spaced-apart ports formed in said housing in each of said first and second cylinders, respectively;
a closable continuous conduit connecting said ports to each other exterior of said housing;
third valve means, operated by control power fluid, for preventing passage of operating fluid through said continuous conduit when in one position and for permitting exhausting of operating fluid from one of said cylinders through said conduit to the other of said cylinders when in another position, said third valve means being the sole valve means in said continuous conduit;
said first valve means being in said one position thereof permitting introduction of operating fluid into said first cylinder and preventing exhaust of operating fluid from said first cylinder through said first valve means upon failure of control power fluid to said first valve means;
said second valve means being in said one position permitting introduction of operating fluid into said second cylinder and preventing exhaust of operating fluid from said second cylinder through said second valve means upon failure of control power fluid to said second valve means;
said third valve means being in said other position thereof to permit exhaust of operating fluid through said conduit from one of said cylinders to the other of said cylinders upon failure of control power fluid to said third valve means;
said spaced-apart ports being located on said housing such that when said pistons and thereby said shaft are in a position other than a predetermined position said conduit exhausts operating fluid from one of said cylinders until said predetermined position is reached by said pistons by blockage of said ports by said pistons upon failure of control power fluid to each of said first, second, and third valve means;
said third valve means permitting exhaust of said operating fluid from one of said cylinders to the interior of said housing between said pistons, said housing being provided with an exhaust port for said vented operating fluid.

2. An actuator as recited in claim 1 in which said first valve means comprises separate inlet and exhaust valves arranged on said first cylinder, and said second valve means comprises separate inlet and exhaust valves arranged on said second cylinder.

3. An actuator as recited in claim 2 wherein said shaft is rotatable, said means mechanically linking said pistons to each other and to said shaft comprising means adapted to convert linear force of said pistons to rotary force for rotating and positioning said shaft.

4. An actuator as recited in claim 3 in which said means adapted to convert linear force of said pistons comprises rack and pinion gears, said rack connecting said pistons and said pinion gear being mounted on said shaft.